United States Patent
Koga

(10) Patent No.: US 10,046,592 B2
(45) Date of Patent: Aug. 14, 2018

(54) MAGNETIC PEN

(71) Applicant: Zero Lab Co., Ltd., Tokyo (JP)

(72) Inventor: Ritsuo Koga, Tokyo (JP)

(73) Assignee: Zero Lab Co., Ltd., Tokyo (JP)

( * ) Notice: Subject to any disclaimer, the term of this patent is extended or adjusted under 35 U.S.C. 154(b) by 0 days.

(21) Appl. No.: 15/663,287

(22) Filed: Jul. 28, 2017

(65) Prior Publication Data
US 2018/0029404 A1    Feb. 1, 2018

(30) Foreign Application Priority Data
Jul. 28, 2016 (JP) .................................. 2016148086

(51) Int. Cl.
| G06F 3/033 | (2013.01) |
| B43K 23/00 | (2006.01) |
| B43L 1/00  | (2006.01) |
| B43K 29/10 | (2006.01) |
| B43K 29/00 | (2006.01) |

(52) U.S. Cl.
CPC ............ *B43K 23/001* (2013.01); *B43K 29/10* (2013.01); *B43L 1/008* (2013.01); *B43K 29/00* (2013.01)

(58) Field of Classification Search
CPC ... G06F 3/03; G06F 3/046; G02F 1/00; A63H 33/26; B43K 8/00; B43K 19/08; B43K 23/001; B43K 29/10; B43L 1/008
See application file for complete search history.

(56) References Cited

U.S. PATENT DOCUMENTS

| 4,143,472 A * | 3/1979 | Murata ................... B43L 1/008 434/409 |
| 4,996,392 A | 2/1991 | Tagawa |
| 5,674,104 A * | 10/1997 | Ohashi ................... B43K 23/04 401/206 |
| 5,820,385 A * | 10/1998 | Ohashi ................... B43L 1/008 434/408 |
| 5,999,170 A | 12/1999 | Ooura et al. |
| 6,196,848 B1 * | 3/2001 | Yamazaki ............... A63H 33/22 434/409 |
| 6,639,579 B1 * | 10/2003 | Nihira ..................... G09F 9/375 345/107 |
| 6,733,298 B2 * | 5/2004 | Chen ....................... B43L 1/008 434/409 |
| 6,897,848 B2 * | 5/2005 | Sheridon ............... G02B 26/026 345/107 |
| 6,943,772 B2 * | 9/2005 | Yasuda ................... G09F 9/375 345/107 |
| 6,970,154 B2 * | 11/2005 | Sheridon ............... G02B 26/026 345/107 |

(Continued)

FOREIGN PATENT DOCUMENTS

| CN | 203902038 U | 10/2014 |
| EP | 0848366 A2 | 6/1998 |

(Continued)

*Primary Examiner* — Joe H Cheng
(74) *Attorney, Agent, or Firm* — Slater Matsil, LLP

(57) ABSTRACT

A magnetic pen can be used with a magnetic panel. The magnetic pen includes a body with an end portion. A holder made of a magnetic material is attached to the end portion and an internal space is formed in the holder. A magnet having an S pole and an N pole is arranged in the internal space of the holder so that the S pole and the N pole are opposite the magnetic panel.

18 Claims, 17 Drawing Sheets

(56) References Cited

U.S. PATENT DOCUMENTS

| | | | | |
|---|---|---|---|---|
| 2005/0038944 A1* | 2/2005 | Harada | ................... | G06F 3/016 |
| | | | | 710/110 |
| 2008/0030290 A1* | 2/2008 | Norman | ................. | B43L 1/004 |
| | | | | 335/296 |
| 2008/0200796 A1* | 8/2008 | Graham | ................. | G01R 33/28 |
| | | | | 600/411 |

FOREIGN PATENT DOCUMENTS

| | | |
|---|---|---|
| JP | S51130210 A | 11/1976 |
| JP | 60-72282 U1 | 5/1985 |
| JP | 61036828 A | 2/1986 |
| JP | H01239490 A | 9/1989 |
| JP | 1155537 U | 10/1989 |
| JP | 01156988 U | 10/1989 |
| JP | 02111597 A | 4/1990 |
| JP | 3013649 U | 7/1995 |
| JP | 3013650 U | 7/1995 |
| JP | 2009000935 A | 1/2009 |

* cited by examiner

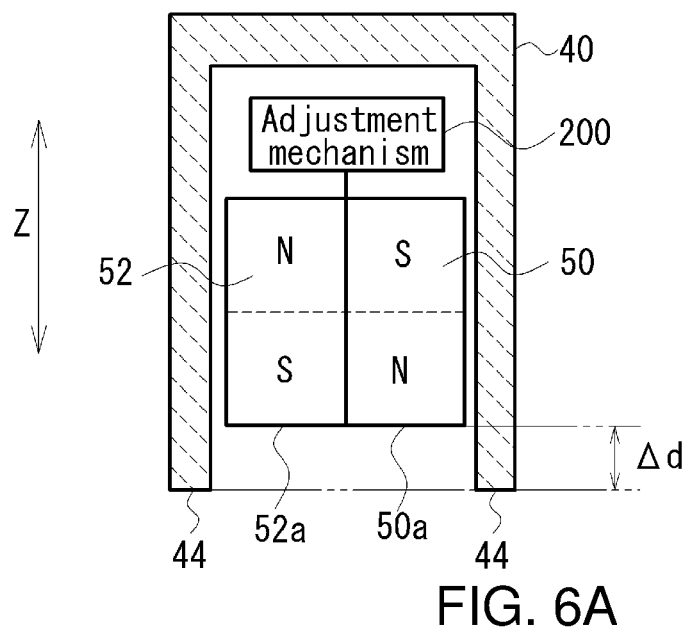
FIG. 6A
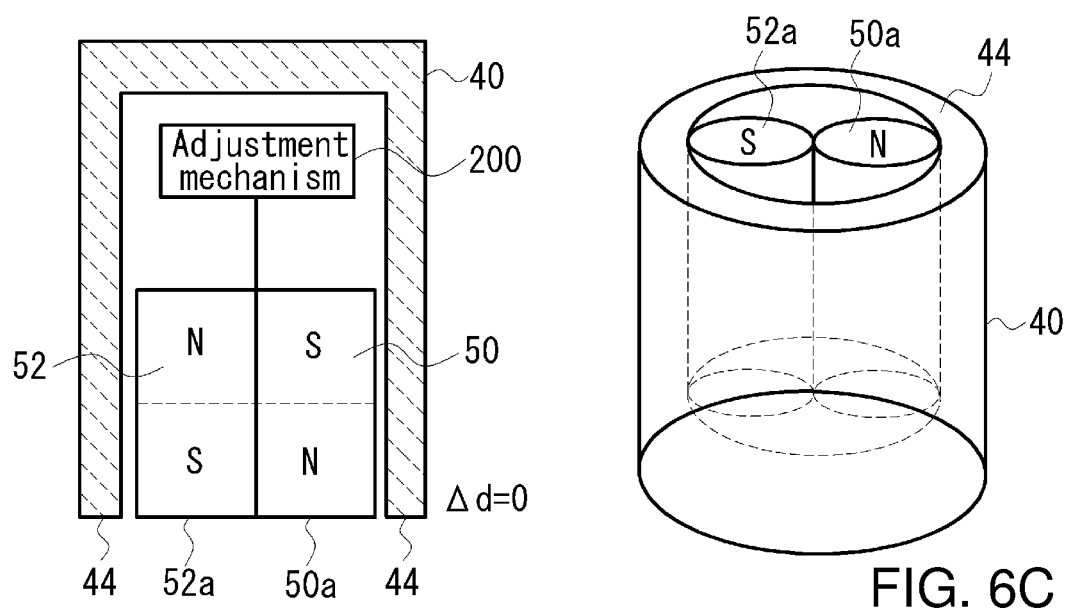
FIG. 6B
FIG. 6C

Partially enlarged view

Bottom view

MAGNETIC PEN

CROSS-REFERENCE TO RELATED APPLICATIONS

This application claims priority to Japanese Application No. 2016-148086, filed on Jul. 28, 2016, which application is hereby incorporated herein by reference.

TECHNICAL FIELD

The present invention relates to a magnetic pen, e.g., one that is capable of drawing arbitrary characters, figures, symbols, etc. by applying a magnetic field to a display panel including magnetized display bodies.

BACKGROUND

When a magnetic pen with a magnet attached to the end portion is drawn with respect to a magnetic panel including magnetized display bodies, the magnetic field of the magnetic pen acts on the display bodies so that character, figure, symbol, or the like corresponding to the moving track of the magnetic pen can be displayed at a magnetic panel. For a magnetic pen that applies the magnetic field to the magnetic panel, Japanese patent publication No. 2009-935, for example, discloses a magnetic pen that weakens the pressure in writing applied to the magnetic panel with a simple structure. In addition, Japanese patent publication No. 2007-256891, Japanese patent registration No. 2717536, and Japanese patent registration No. 4089808 each discloses a magnetic panel that forms a recording layer by enclosing magnetic particles in microcapsules.

The conventional magnetic pen has the following problems. FIG. 12 shows a sectional view of an end portion of the conventional magnetic pen. A cylindrical holder 1 made of a nonmagnetic material such as plastic, resin or brass or the like is provided at the end portion of the magnetic pen to accommodate a magnet 2 in an internal space of the holder 1. The magnet 2 is arranged to protrude somewhat from an edge 3 of the holder 1. Lines of magnetic force 4 are formed from an N pole to an S pole of the magnet 2 to act on the magnetic panel (not shown) to move cataphoretically display bodies such as a microcapsule of the magnetic panel.

In the conventional magnetic pen, the lines of magnetic force 4 from the N pole to the S pole protruding from the edge 3 of the holder 1 spread out in the radial direction of the holder 1, in other words lines of magnetic force 4 includes lots of portions 4a which are spread out in the horizontal direction, as the result when characters or figures are drawn on the magnetic panel, the outlines of characters or figures are blurred, lines are exuded, and edges are unclear. For example, when drawing the Japanese word for "rice", the four squares were sometimes crushed.

Furthermore, the thickness of line segment such as characters displayed on the magnetic panel depends on the size and shape of the end portion of the magnetic pen. For example if the magnet size in the width direction is increased, the thickness of line segment on the magnetic panel is thickened. However, when the width of the magnet 2 in the magnetic pen as shown in FIG. 12 is spread, the lines of magnetic force 4a extending in the horizontal direction are greater than that of the vertical direction, not only the edges of line segments are blurred, it may happen that character is erased while drawing.

SUMMARY

Embodiments of the present invention solve such conventional problems and provide a magnetic pen that enables to draw clear images as compared with the conventional art.

In the present invention, a magnetic pen for a magnetic panel comprises a holder made of a magnetic material attached to an end portion of the magnetic pen. An internal space is formed in the holder. A magnet is arranged in the internal space of the holder so that at least the S pole and the N pole are opposite the magnetic panel.

In some embodiments, the surface of the magnet is located so as to be recessed from the edge of the holder.

In some embodiments, the surface of the magnet is at the same position as the edge of the holder.

In some embodiments, the magnetic pen further comprises an adjusting mechanism for adjusting a position of the magnet with respect to the edge of the holder.

In some embodiments, the magnet includes a plurality of S poles and a plurality of N poles so as to face the magnetic panel.

In some embodiments, the plurality of S poles and the plurality of N poles are arranged in rotational symmetry with respect to the axial center of the holder.

In some embodiments, the magnetic pen further comprises a magnetic member arranged in the internal space of the holder adjacent to the magnet.

In some embodiments, the magnetic member is disposed at the axial center of the holder.

In some embodiments, the magnetic pen further comprises a grip portion connected to the end portion. The end portion is connected to the grip portion through an universal joint.

In some embodiments, the universal joint provides a two-dimensional or three-dimensional connection so that the axis of the holder is substantially perpendicular to the plane of the magnetic panel.

In some embodiments, the end portion includes a sliding guide for sliding on the surface of the magnetic panel and the sliding guide is connected to the universal joint.

In some embodiments, the universal joint is attached so as to offset from the center of the holder.

In some embodiments, the universal joint is attached coaxially with the center of the holder.

In some embodiments, the universal joint is comprised of an elastic member.

In some embodiments, the magnetic pen is configured such that the end portion is rotatable about an axis.

Furthermore in the present invention, a magnetic pen for a magnetic panel comprises a holder made of a magnetic material attached to an end portion of the magnetic pen. An internal space is formed in the holder. A magnet is disposed in the internal space of the holder. A surface of the magnet opposite the magnetic panel is at a position recessed from an edge of the holder.

According to the present invention, since the magnet of the S pole and the N pole are arranged in the holder of the magnetic material at the end portion so as to face the magnetic panel, the lines of magnetic force are acted effectively on the magnetic panel compared with the conventional magnetic pen, as the result characters with sharp edges and less exuding can be drawn on the magnetic panel.

BRIEF DESCRIPTION OF THE DRAWINGS

FIG. 3, which includes FIG. 3A shows a plan view of the holder at the end portion and its cross-sectional view of line A-A, FIG. 3B shows a plan view of the holder in which magnets are held and its cross sectional view of A-A line, and FIG. 3C shows a perspective view of the holder in which magnets are held.

FIG. 6, which includes FIGS. 6A-6C, shows a cross-sectional view and a perspective view of the end portion of a magnetic pen according to a second embodiment of the present invention.

FIG. 7, which includes

FIG. 9, which includes

FIG. 10, which includes

FIG. 11, which includes

Figure 1:
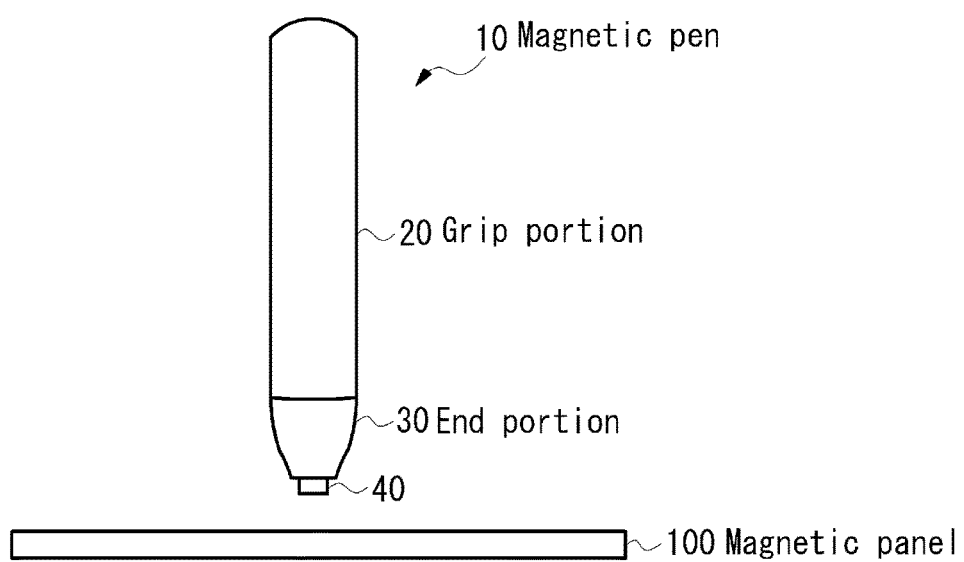
FIG. 1 shows a front view of a magnetic pen according to a first embodiment of the present invention.

The following reference numerals can be used in conjunction with the drawings:
- 10: Magnetic pen
- 20: grip portion
- 30: distal end portion
- 40: holder
- 42: internal space
- 44: edge
- 50, 52: magnet
- 50a, 52a: surface
- 70: universal joint
- 80: sliding guide
- 100: magnetic panel
- 110: top sheet
- 120: back sheet
- 130: microcapsule

DETAILED DESCRIPTION OF ILLUSTRATIVE EMBODIMENTS

Next, embodiments of the present invention will be described in detail with reference to the drawings. In a preferred embodiment of the present invention, the magnetic pen includes a magnet at its end portion, and the magnetic pen is enable to draw characters, figures, pictures, and etc. on a magnetic panel by causing magnetic field to act on the magnetic sheet such as a magnetophoretic type or a magnetic reversal type. Please note that the configurations shown in the drawings for explaining the embodiments of the present invention are different from the actual ones.

Figure 2:
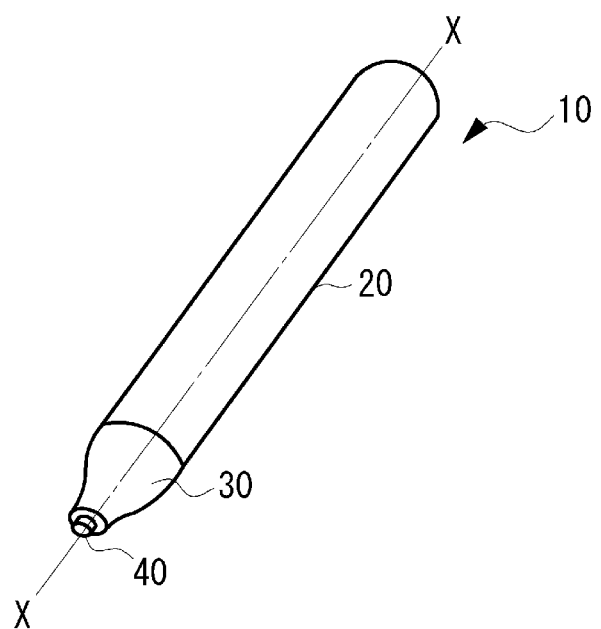
FIG. 2 shows a perspective view of the magnetic pen according to the first embodiment of the present invention.

FIG. 1 shows a front view of a magnetic pen according to a first embodiment of the present invention, and FIG. 2 shows a perspective view of the magnetic pen. The magnetic pen 10 includes a cylindrical grip portion (body portion) 20 for gripping and an end portion 30 connected to the grip portion 20. When the magnetic pen 10 is slid on the magnetic panel 100, characters, figures and the like corresponding to the trajectory of the magnetic pen 10 can be drawn on the magnetic panel 100 by the action of the magnetic field from the magnetic pen 10. Details of the magnetic panel will be described later.

The grip portion 20 is sufficient if it has a length enough for the user to grasp by hand and the material of the grip portion 20 is not particularly limited. For example, the grip portion 20 can be made of a plastic or resin material etc. as well as the material of the conventional magnetic pen. The end portion 30 is coupled with the grip portion 20 and is provided with a magnet for exerting a magnetic field on the magnetic panel 100.

Figure 3A:
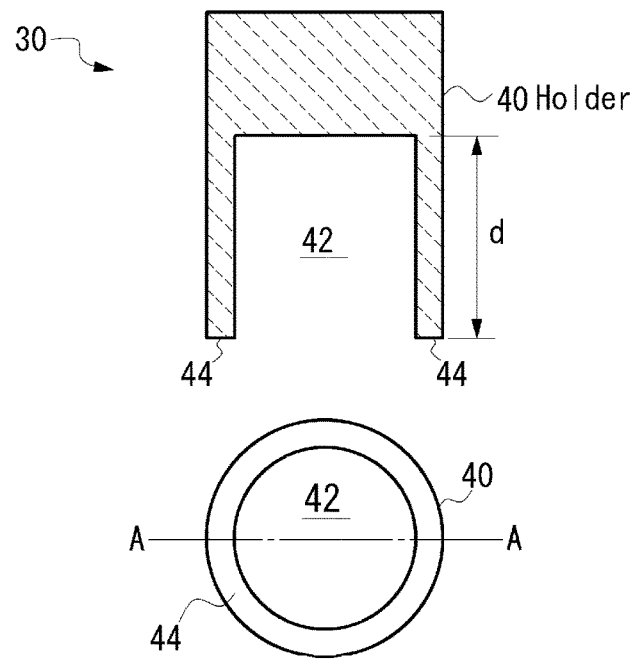
FIGS. 3A-3C, shows an end portion of the magnetic pen according to the first embodiment of the present invention.
Figure 3B:
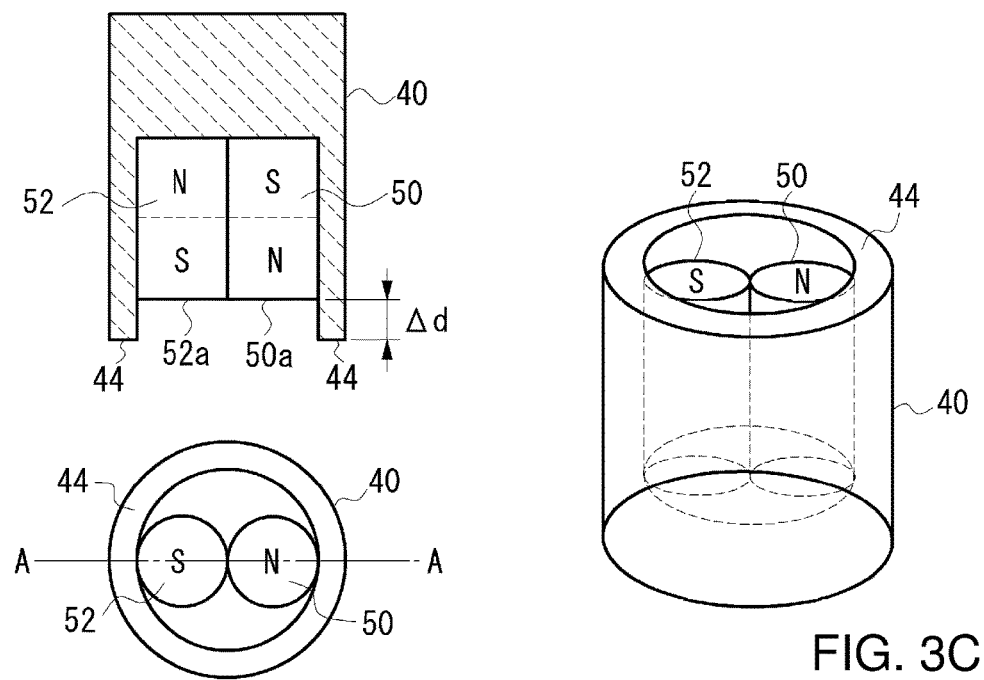
Figure 3C:
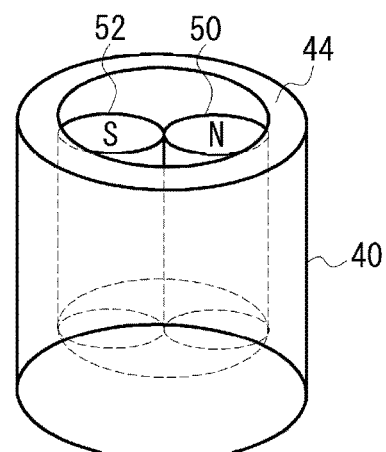

FIG. 3 shows details of the end portion 30. The end portion 30 includes a cylindrical holder 40, which is made of a magnetic material. The magnetic material is, for example, iron, soft iron or the like. A cylindrical internal space 42 is formed in the holder 40 and has a predetermined depth d from a circumferential edge 44. The outer diameter φ of the holder 40 is appropriately selected according to the shape and size of the magnet to be accommodated in the internal space 42.

The end portion 30 further includes a magnet accommodated in the internal space 42. In one preferred example, a pair of cylindrical magnets 50, 52 is accommodated in the internal space 42. The pair of magnets 50, 52 is preferably of the same size. This, however, is not a limitation and the magnets 50, 52 may be different sizes. The outer diameter φ of the magnets 50, 52 is preferably 0.5 mm or more in terms of handling, but it is not necessarily limited to this. From the viewpoint of the lines of magnetic field, about 0.5 to 1.2 mm is practically preferable. As the diameter increases, the edges of letters or the like are likely to be unclear because the lines of magnetic force parallel to the magnetic panel from the magnet increase.

As shown in FIG. 3B, the magnets 50, 52 are accommodated in the internal space 42 so that the S pole and the N pole of each magnet are reversed relationship in their positions. In the illustrated example, the N pole of the magnet 50 is exposed to the side of edge 44 and the S pole of the magnet 52 is exposed to the side of the edge 44. Here, two magnets 50, 52 are accommodated in the holder, but if the number of magnets is increased, the diameter of the holder also increases accordingly, and a thick line can be drawn.

Figure 10A:
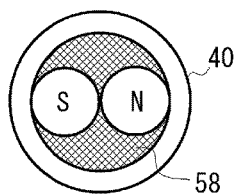
FIGS. 10A-10L, shows various examples for arranging magnets applied to each embodiment of the present invention.
Figure 10B:
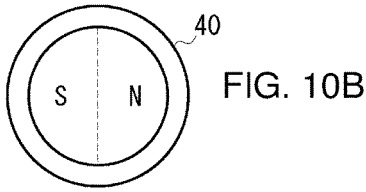
Figure 10C:
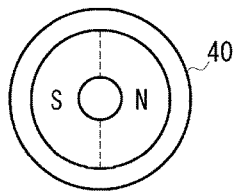
Figure 10D:
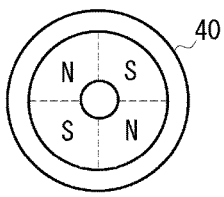

Each magnet 50, 52 has a length in the axial direction shorter than the depth d of the internal space 42. When one end of each magnet 50, 52 contacts with the bottom of the internal space 42, each surface 50a, 52a of the other end of the magnets 50, 52 is positioned by Δd recessed from the edge 44 of the holder 40. One end of the magnets 50, 52 is fixed to the bottom of the internal space 42 with an adhesive or the like. Although Δd depends on the strength of the magnetic flux of the magnet and its diameter, it is, for example, about 0.1 to 0.5 mm, preferably about 0 to 0.3 mm. A gap or a space formed between the magnets 50, 52 and the internal space 42 may be filled with a magnetic material such as soft iron or a yoke 58 or the like (see FIG. 10A).

Figure 4:
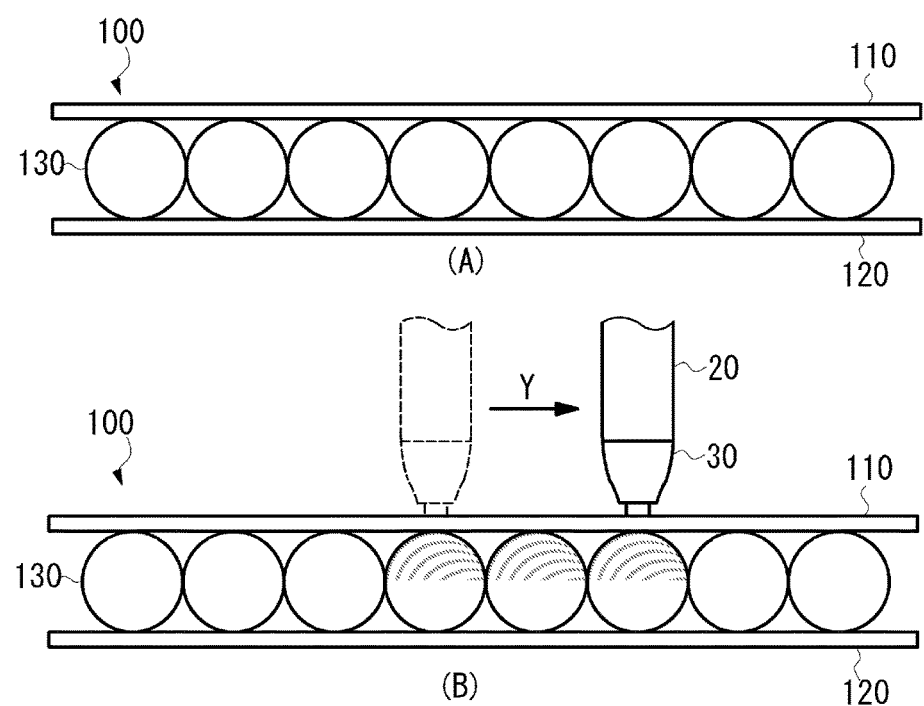
FIG. 4 exemplifies a cross-sectional view of a magnetic panel applicable with the magnetic pen according to the first embodiment of the present invention.

FIG. 4 shows an example of a magnetic panel that the magnetic pen of this embodiment can be used. The magnetic panel 100 includes a top sheet 110, which is a transparent sheet capable of transmitting a magnetic field, for providing the display surface of the magnetic panel, a back sheet 120 opposite the top sheet 110, and a plurality of microcapsules 130 two-dimensionally arranged in the space between the top sheet 110 and the back sheet 120. The plurality of microcapsules 130 are accommodated in a case (not shown).

Preferably, the microcapsule 130, for example, includes at least one kind of magnetic particles having a particle size of 0.1 μm to 1.0 μm, at least one kind of magnetic particles having a particle size of 1 μm to 20 μm, white nonmagnetic particles such as white titanium oxide, dispersion and additives in a transparent spherical cell. The size of the microcapsules is, for example, 50 to 650 μm. Such a magnetophoretic type magnetic panel is disclosed in, for example, Japanese patent No. 4089808 4 and has following features.

A. Small particles are easily reacted in the direction of lines of magnetic force with horizontal lines of magnetic force.

B. In the magnetic pen having the vertical lines of magnetic force, the large and small magnetic particles are reacted to allow the front side to change black for drawing characters.

C. When erasing from the front side of the magnetic panel, if only the horizontal magnetic field lines are applied to the small particles sensitive to the horizontal lines of magnetic force, the small particles migrate in the direction of the lines of magnetic force to change white. At this time, since the large particles rarely react, they remain "black", and the black can be seen through from the front side, so that it does not completely become white, which generates decrease in contrast.

D. In order to erase characters, it is sufficient to react horizontal lines of magnetic force. On the contrary, a magnetic pen having horizontal lines of magnetic force erase the written characters by itself immediately, which causing defects.

One microcapsule 130 forms one pixel. For example, as shown in FIG. 4B, when the magnetic field is applied to the microcapsule 130 by the magnetic pen 10 on the top sheet 110, as described above, in response to the lines of magnetic force in the vertical direction from the magnetic pen, the black magnetic particles in the microcapsules 130 migrate to the front surface. In this manner, when the magnetic pen 10 is moved on the top sheet 110, the magnetic particles in the microcapsules 130 migrate in accordance with the movement to form images. On the other hand, when erasing the images, an erasing magnet (not shown) is slid on the top sheet 110, and small particles migrate to the front side in response to the lines of magnetic force in the horizontal direction from the erasing magnet to erase the images. In this case, it is desirable that a certain clearance is provided between the erasing magnet and the top sheet 110 so as to apply a large amount of horizontal lines of magnetic force to the magnetic panel.

Note that the microcapsule 130 is not necessarily limited to the above structure. For example, the microcapsule 130 may include permanent magnet particles in a transparent spherical cells and the permanent magnet particle may be magnetized so as to have N pole and S pole. The magnetic panel may be erased from the front side or back side. For example, the permanent magnet particles of N pole may be painted black, and the permanent magnet particles of S pole may be painted white, and the permanent magnet particles can move freely within the cell according to the magnetic field from the magnetic pen or erasing magnet.

In addition to the magnetophoresis type, the magnetic panel may be a magnetic reversal type magnetic sheet. Further, the magnetic panel 100 may erase the drawn images by applying the magnetic field from the top sheet 110 or may erase the drawn images by applying the magnetic field from the back sheet 120.

Figure 5:
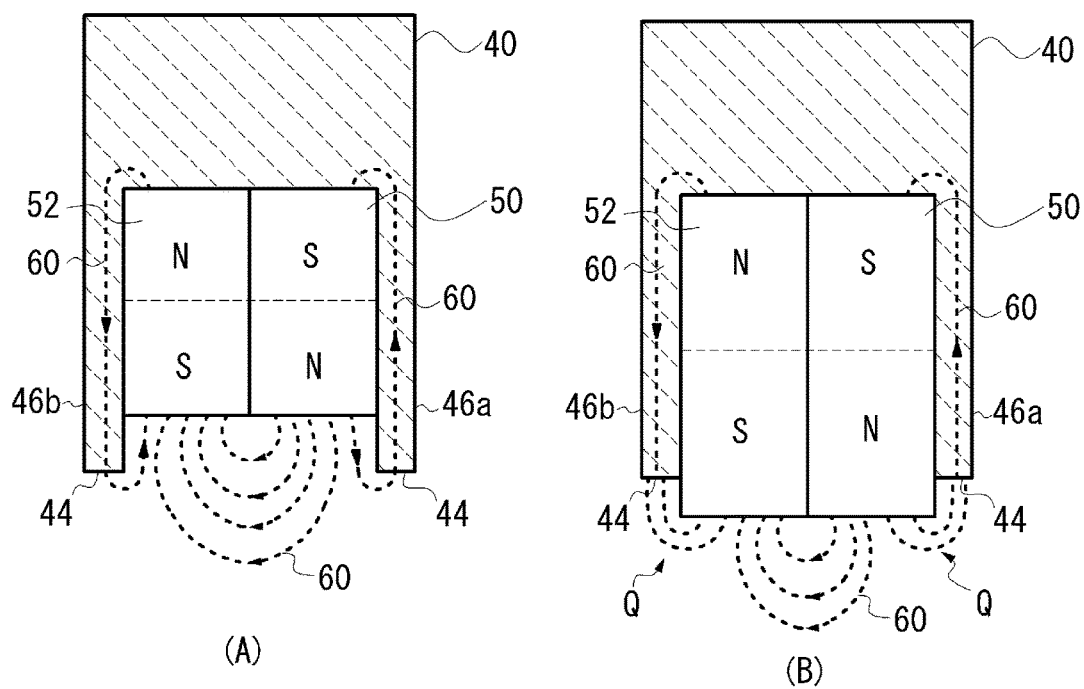
FIG. 5 shows a view for explaining the operation of the magnetic pen according to the first embodiment of the present invention.

The operation of the magnetic pen 10 according to the embodiment will be described. FIG. 5A schematically shows the lines of magnetic force generated by the magnets 50, 52 in the holder 40 according to this embodiment. In this embodiment, since the surfaces of the magnets 50, 52 are disposed so as not to protrude from the edge 44 of the holder 40 of a magnetic material, the lines of magnetic force 60 extending from the N pole of the magnet 50 to the S pole of the magnet 52 is converged within the radial direction so as not to exceed the holder 40. In other words, the lines of magnetic force from the outermost shell of the N pole of the magnet 50 enters the S pole via the side wall 46a of the holder 40, whereas the lines of magnetic force from the N pole of the magnet 52 enters the S pole of the magnet 52 via the side wall 46b of the holder 40, so the lines of magnetic force are confined in the radial direction. That is, the lines of magnetic force from the N pole surface of the magnet 50 to the S pole surface of the magnet 52 extend in the vertical direction and are restricted within the radius of the holder 40, and the microcapsules 130 as shown in FIG. 4 are acted by the restricted lines of magnetic force. As the result, the magnetic particles in the microcapsules 130 which are acted by the lines of magnetic force in the vertical direction within the restricted area are migrated, and, for example, the magnetic particles migrate to the front side.

On the other hand, FIG. 5B schematically shows the lines of magnetic force in which the magnets 50, 52 protrude from the edge 44 of the holder 40. In this case, since the surfaces of the magnets 50 and 52 protrude from the edge 44, the lines of magnetic force Q from the N pole of the magnet 50 to the side wall 46a of the holder 40 extend in the horizontal direction somewhat. When the lines of magnetic force Q extending in the horizontal direction act on the microcapsule 130, the magnetic particles in the capsule receive the magnetic force in a direction to erase, for example, the magnetic particles migrate to the back side, and instead the white nonmagnetic particles receive the magnetic force to migrate to the front side, as the result, characters are drawn by the lines of magnetic force 60 at the center of the holder 40, and simultaneously the edges of characters drawn by the outer lines of magnetic force Q at the outer edge are erased, thereby edges and outlines of images being blurred. Also, depending on the magnetic panel, the lines of magnetic force in the horizontal direction weakens the attraction force to attract the magnetic particles, so black and white are mixed in that portion, thereby the edge of images being blurred.

Figure 12:
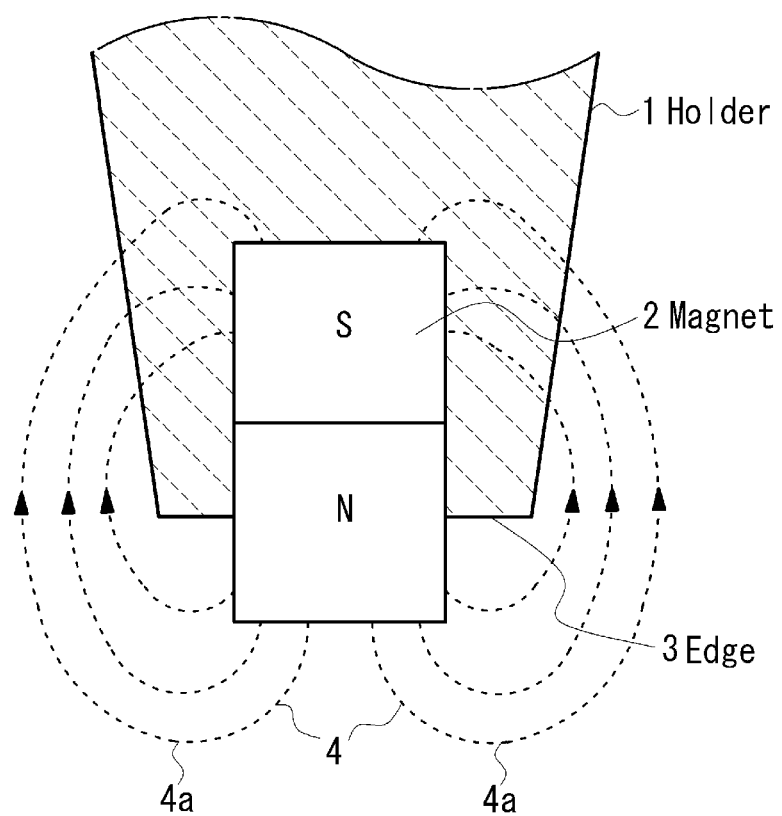
FIG. 12 shows a view for explaining problems of a conventional magnetic pen.

Further, as described in FIG. 12, even if the holder 40 is made of a metal such as a non-magnetic material, for example brass, since the lines of magnetic force of the magnets 50 and 52 include portions which exceed the radial direction of the holder and spread out in the horizontal direction somewhat, due to the above reason the lines of magnetic force in the direction to erase at the edge of the drawn images or the lines of magnetic force to weaken the attraction force of the magnetic particles is acted, therefore the characters or the like are blurred.

Next, a second embodiment of the present invention will be described. In the first embodiment, the vertical position of the magnets in the holder 40 is fixed. The magnetic pen in the second embodiment, however, has a function of varying the height of the magnets in the holder 40.

FIG. 6A is a cross-sectional view for showing the configuration of the end portion of the magnetic pen according to the second embodiment of the present invention. The second embodiment includes an adjusting mechanism 200 for adjusting the heights of the magnets 50, 52 in the holder 40. The adjustment mechanism 200 can be configured using kinds of known techniques. For example, the adjustment mechanism 200 includes a screw mechanism for changing the heights of the magnets 50 and 52 by rotating screws. In this case, a manipulating member for rotating the screw is attached so as to be available from the outside of the holder 40. Alternatively, the adjustment mechanism 200 may include a slide mechanism for changing the height of the magnets 50, 52 by sliding the slide member in up and down directions. In this case, a manipulation member for sliding is attached so as to be available from the outside of the holder 40.

FIGS. 6B and 6C show a state in which the surfaces 50$a$, 52$a$ of the magnets 50, 52 are adjusted to the same position as the edge 44 of the holder 40 by the adjusting mechanism 200 ($\Delta d=0$). It should be noted here that the maximum position at which the height of the magnets 50, 52 can be varied by the adjustment mechanism 200 is up to the position where the surfaces 50$a$, 52$a$ of the magnets 50, 52 do not exceed the edge 44 ($\Delta d<=0$).

In the second embodiment, by adjusting the heights of the magnets 50, 52, it is possible to vary the magnitude of the lines of magnetic force that can act on the magnetic panel 100 from the magnetic pen 10, and to adjust the thickness and density of the line segment to be drawn.

Next, a third embodiment of the present invention will be described. It is desirable that the lines of magnetic force generated from the magnetic pen 10 are incident perpendicularly to the plane of the magnetic panel 100. In the first and second embodiments, since the end portion 30 and the holder 40 are fixed with respect to the grip portion 20, the user is forced to stand the magnetic pen 10 perpendicularly to draw. The third embodiment makes it possible for the user to tilt the magnetic pen 10 in drawing while ensuring that the lines of magnetic force are incident substantially perpendicularly to the magnetic panel 100.

Figure 7A:
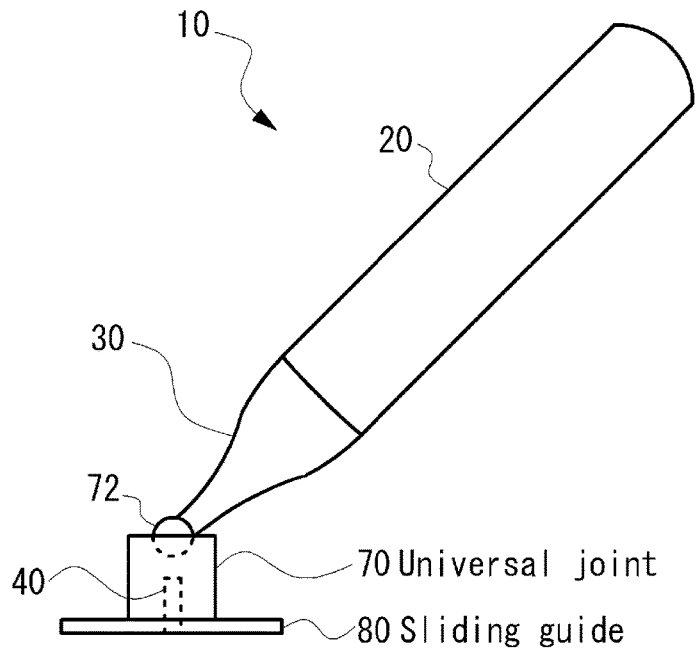
FIGS. 7A-7D, shows a view for explaining the magnetic pen according to a third embodiment of the present invention.
Figure 7B:
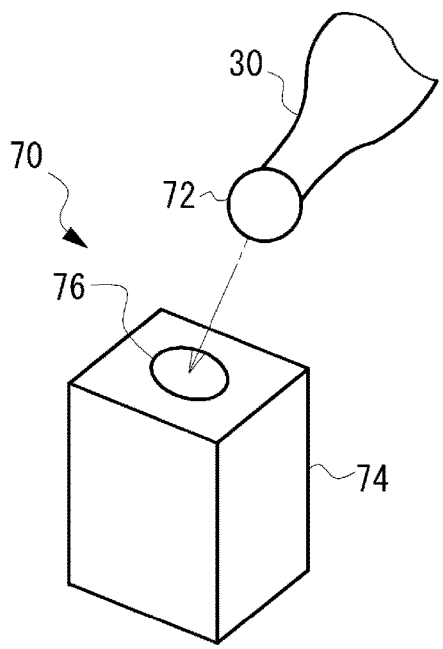
Figure 7C:
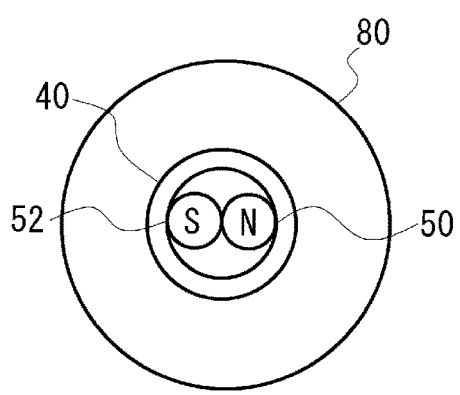
Figure 7D:
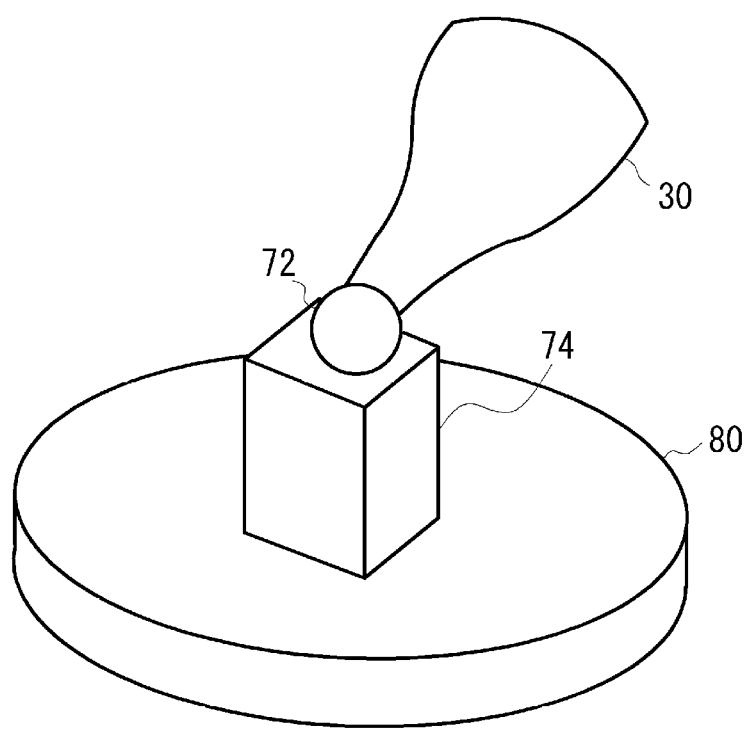

As shown in FIG. 7A and FIG. 7D, which shows an enlarged perspective view of FIG. 7A, the magnetic pen 10 according to the third embodiment includes a universal joint 70 for connecting the end portion 30 with the holder 40, and includes a sliding guide 80 for guiding the sliding of the holder 40. The universal joint 70 may be, for example, a ball joint as shown in FIG. 7B. The universal joint 70 includes a ball 72 formed at a tip of the end portion 30 and a rectangular bearing body 74 for connecting the ball 72. A semicircular bearing hole 76 is formed at an upper end portion of the bearing body 74 to accommodate the ball 72 slidably. Inside the bearing body 76, the holder 40 is incorporated.

The sliding guide 80 is a plate. The bearing body 74 is attached to an upper surface of the sliding guide 80 and the bottom surface slides on the magnetic panel 100. At this time, the axial direction of the magnets 50, 52 accommodated in the holder 40 in the bearing body 74 is in a relationship that its position is perpendicular to the surface of the magnetic panel 100. Preferably, the sliding guide 80 is made of a material that does not increase friction, resistance, etc. when sliding on the magnetic panel 100. In addition, the sliding guide 80 is desirably made of a transparent material so that characters or the like drawn on the magnetic panel 100 can be seen through.

The sliding guide 80 is formed, for example, in a circular shape, but may have a shape other than this (for example, a quadrangular shape). If the sliding guide 80 is made of a nonmagnetic material, the opening of the holder 40 in the bearing body 74 may be closed by the sliding guide 80. Alternatively, an opening having a size matching the shape of the holder 40 may be formed in the sliding guide 80 so that the opening of the holder 40 is exposed to the magnetic panel side. FIG. 7C shows the holder 40 and the magnets 50, 52 as viewed from the bottom side of the sliding guide 80.

As described above, according to the third embodiment, the user can tilt the grip portion 20 at an arbitrary angle when drawing, on the other hand, it is guaranteed that the axis of the holder 40 is perpendicular to the magnetic panel 100 when the sliding guide 80 on the magnetic panel 100 is slid, therefore the lines of magnetic force from the magnetic pen 10 can be effectively acted on the magnetic panel 100. Consequently, it is ensured that the line segments of letters or the like drawn on the magnetic panel 100 are clear. If the tip of the magnetic pen (or the tip of the holder) is thinned, the surface of the magnetic panel may be damaged, however, by providing the sliding guide 80, the surface of the magnetic panel is protected.

Figure 8A:
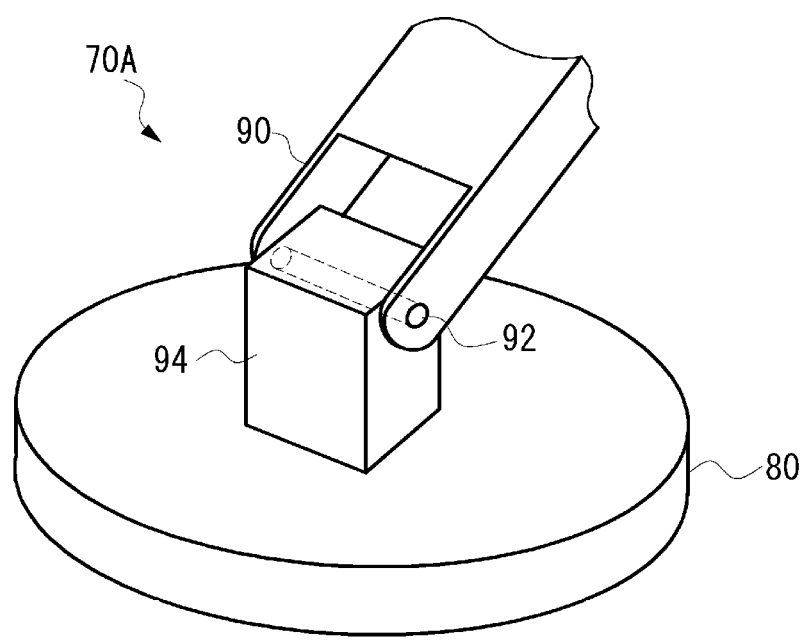
FIG. 8A shows a modified example of the magnetic pen according to the third embodiment of the present invention.

FIG. 8A shows a modified example of the universal joint. The universal joint 70A includes a pair of parallel extending portions 90 extending from the tip of the end portion 30, a rotating shaft 92 attached between the pair of extending portions 90, and a bearing body 94 rotatably supported by the rotating shaft 92. An upper end portion of the bearing body 94 is swingably connected by the rotating shaft 92.

Figure 8B:
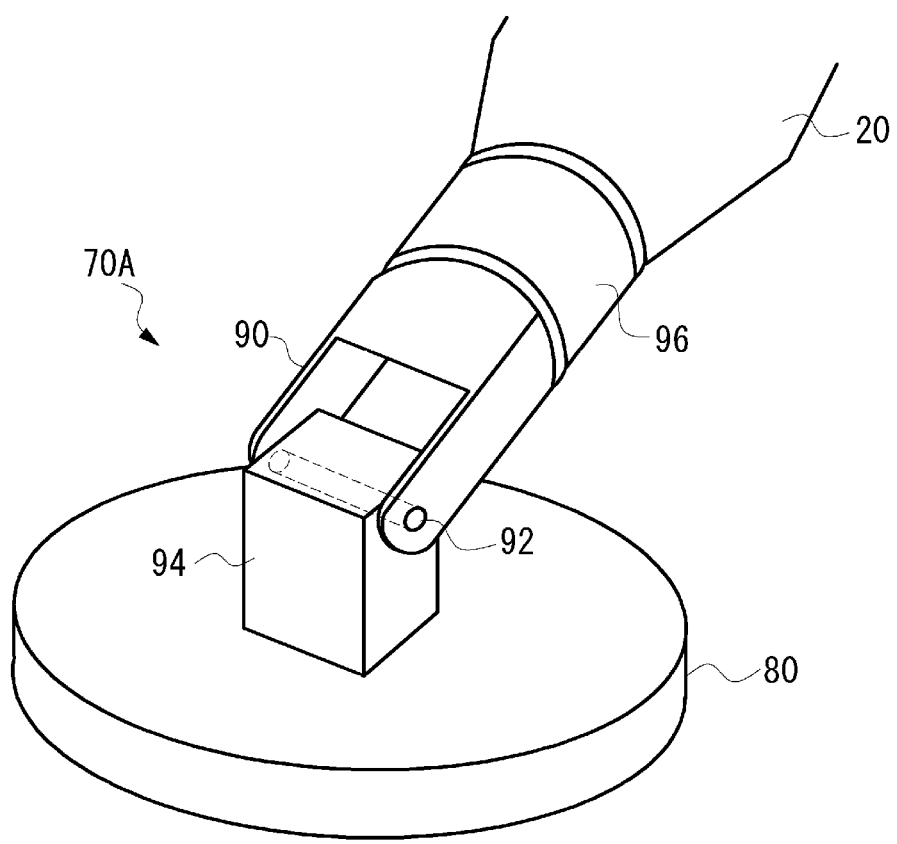
FIG. 8B shows a further modified example of the magnetic pen shown in FIG. 8A.

FIG. 8B is a further modified example of FIG. 8A. In the universal joint 70A shown in FIG. 8A, the movement is restricted in the rotation direction by the rotation shaft 92. In order to eliminate this restriction, the magnetic pen shown in FIG. 8B connects the grip portion 20 with the extending portion 90 through a rotating member 96. The structure of the rotating member 96 is not particularly limited. For example, the rotating member 96 includes a columnar member and rotating shafts at both ends of the columnar member, and the rotating shafts of both ends are rotatably connected to the grip portion 20 and the extending portion 90 respectively.

Figure 8C:
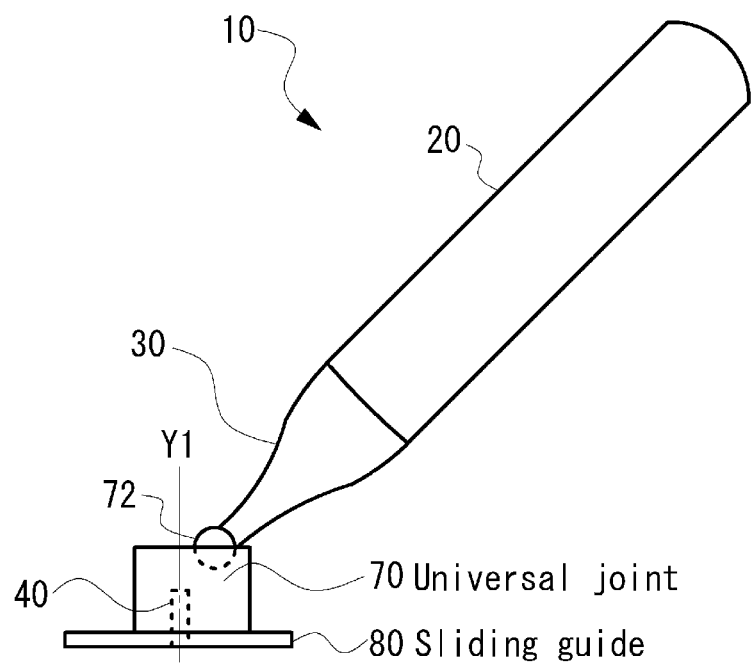
FIG. 8C shows a modified example of the magnetic pen according to the third embodiment of the present invention.

FIG. 8C is a further modified example of the third embodiment. In this modified example, the center of the universal joint 70 is offset from the axis center Y1 of the holder 40. Further, in the modified example shown in FIG. 8D, the universal joint 70 is composed of a coil spring 78 instead of the ball joint. In the example shown in the figure, the center of the coil spring 78 coincides with the axis center Y1 of the holder 40, but the center of the coil spring 78 may be offset from the axis center Y1 as in the case of FIG. 8C. Further, although not shown here, the universal joint 70 may be formed by using another elastic member (for example, a blade spring).

Figure 8D:
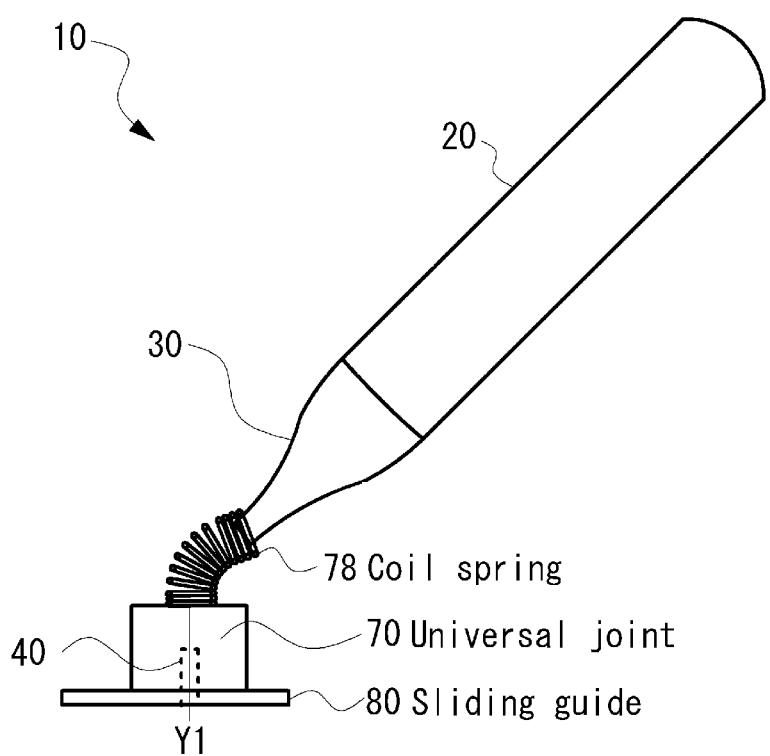
FIG. 8D shows a modified example of the magnetic pen according to the third embodiment of the present invention.
Figure 8E:
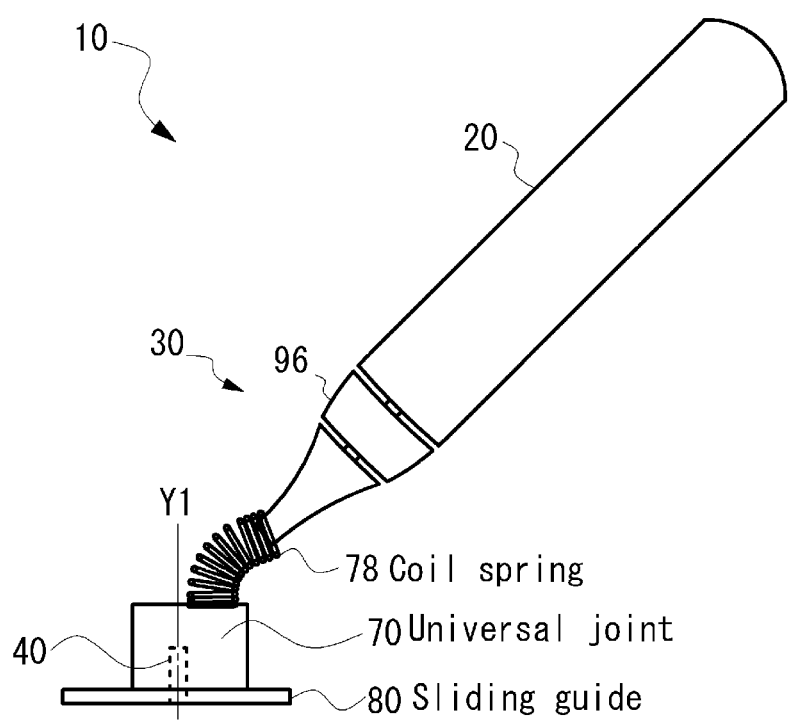
FIG. 8E shows a further modified example of the magnetic pen shown in FIG. 8D.

Furthermore, FIG. 8E is a modified example in which the rotating member 96 shown in FIG. 8B is applied to the magnetic pen with the coil spring 78 in FIG. 8D. As shown in the drawing, the rotating member 96 is preferably provided at the end portion 30, but the rotating member 96 may be provided at a other position (for example, a position at which the coil spring 78 is connected).

In this manner, in the third embodiment, by interposing the universal joint between the grip portion 20 or the end portion 30 and the holder 40, it is possible to make the axis of the holder 40 to be perpendicular to the magnetic panel 100 regardless of the inclination of the grip portion 20, which allows characters or the like to be drawn clearer.

Figure 9A:
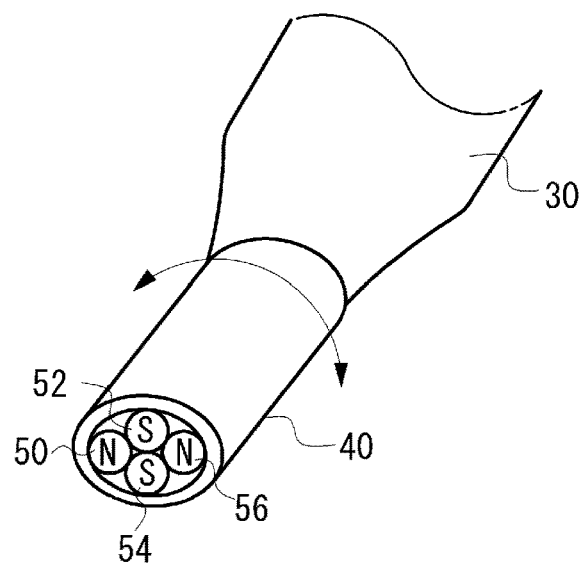
FIGS. 9A-9C, shows a view for explaining a magnetic pen according to a fourth embodiment of the present invention.

Next, a fourth embodiment of the present invention will be described. In the fourth embodiment, the holder 40 is provided with a mechanism for rotating the holder 40. FIG. 9A shows a magnetic pen according to the fourth embodiment. Four cylindrical magnets 50, 52, 54, and 56 are accommodated in a holder 40 attached to the end portion 30. The N poles of the magnets 50 and 56 are exposed to the magnetic panel side; the S poles of the magnets 52 and 54 are exposed to the magnetic panel side. The N poles and the S poles of the magnets 50, 52, 54 and 56 are alternately placed in the holder 40 and are in rotational symmetry with respect to the axis of the holder 40. For example, the holder 40 is connected through a rotating member that is rotatable in the axial direction with respect to the end portion 30.

By accommodating such four magnets 50 to 56 in the holder 40, the magnetic flux density is increased, a large magnetic field can be applied to the magnetic panel 100, thus sharp characters and the like can be drawn. Furthermore, if the diameter of the holder 40 accommodating the four magnets 50 to 56 is increased, it is possible to draw characters and the like having a thicker line segment on the magnetic panel.

Figure 9B:
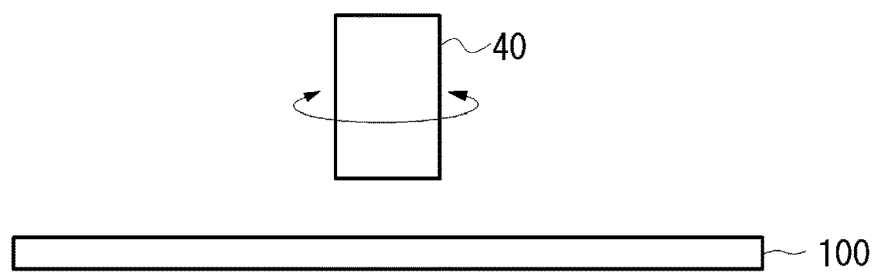
Figure 9C:
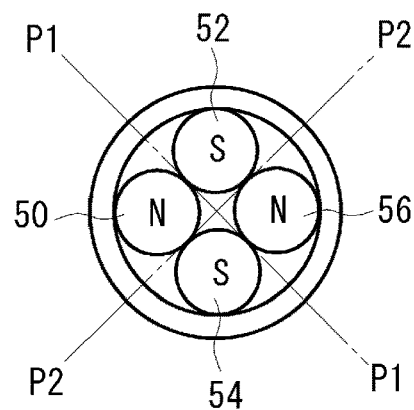

On the other hand, when such four magnets are arranged, the lines of magnetic force from the N poles to the S poles adjacent the axial center of the holder 40 is less likely to occur. As the result, when a line segment is drawn by the magnetic pen 10, as shown in FIG. 9C, stripes with shading unevenness are easily to occur in the diagonal directions P1 and P2. In the fourth embodiment, since the holder 40 is rotatable about the axis, when drawing by the magnetic pen 10, as shown in FIG. 9B, the diagonal directions P1 and P2 of the holder 40 are freely or arbitrarily changed, so that the shading on the drawn line segments or the like is prevented to occur.

Next, a configuration example of various magnets that can be applied to the embodiments of the present invention is shown in FIG. 10. FIG. 10A shows an example in which the magnetic body 58 is disposed in the gap or the space of the holder 40 including the magnets 50 and 52 shown in FIG. 3. By incorporating the magnetic material 58, the lines of magnetic force can be concentrated in the holder 40. FIG. 10B shows an example in which one physical shaped magnet with a S pole and a N pole on the one surface is arranged in the holder 40. FIG. 10C is a modified example of the magnet shown in FIG. 10B, in which a donut-shaped magnet having a through hole at the center is arranged in the holder 40. In this case, as well as in FIG. 10A, for example, a cylindrical magnetic body may be arranged in the space of the central portion. FIG. 10D shows an example in which one physical donut-shaped magnet having two N poles and two S poles on the one surface is arranged in the holder 40. Also in this case, for example, a cylindrical magnetic body may be arranged in the space of the central portion.

Figure 10E:
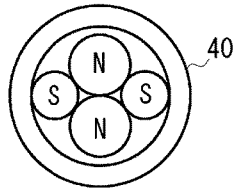
Figure 10F:
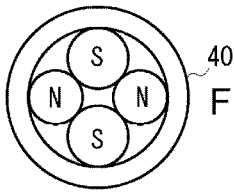

The sizes of the magnets accommodated in the holder 40 may be different from each other. For example, as shown in FIG. 10E, the N pole magnet may be larger than the S pole magnet, which are exposed to the magnetic panel, or conversely, as shown in FIG. 10F, the S pole may be larger than the N.

Figure 10G:
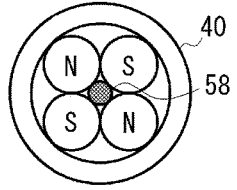
Figure 10H:
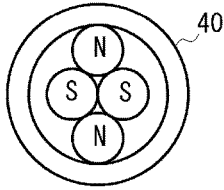
Figure 10I:
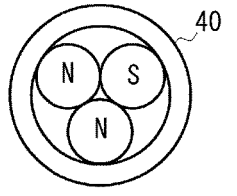
Figure 10J:
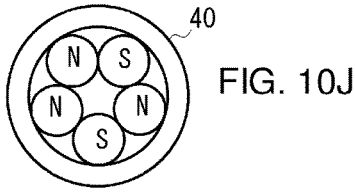
Figure 10K:
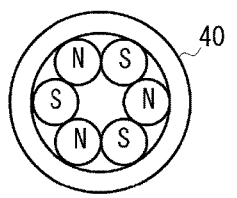
Figure 10L:
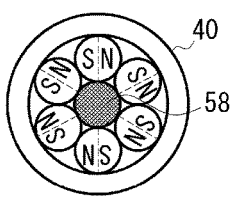
Figure 11A:
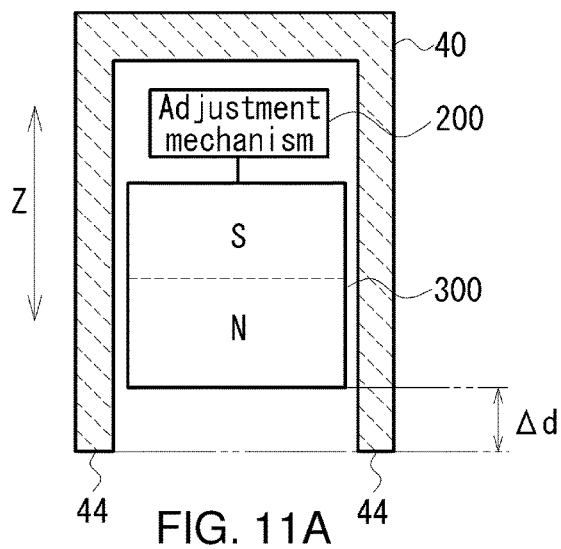
FIGS. 11A-11D, shows a view for explaining a magnetic pen according to a fifth embodiment of the present invention.
Figure 11B:
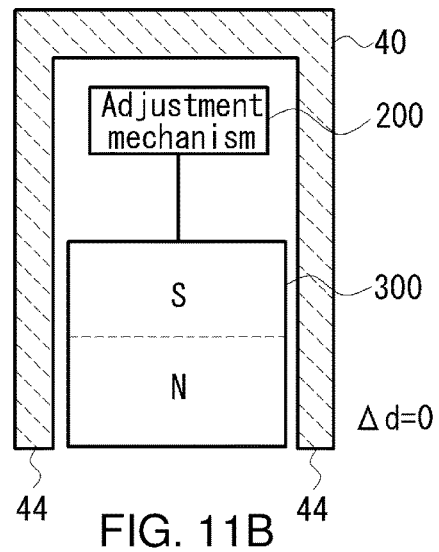
Figure 11C:
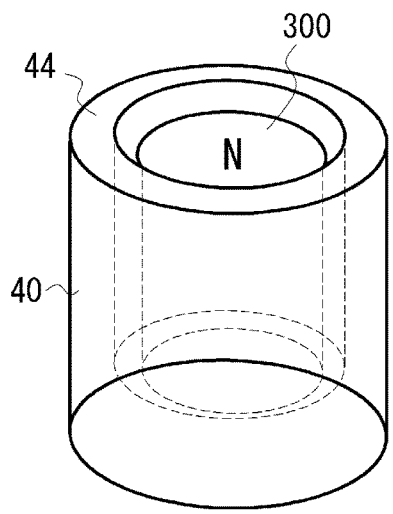
Figure 11D:
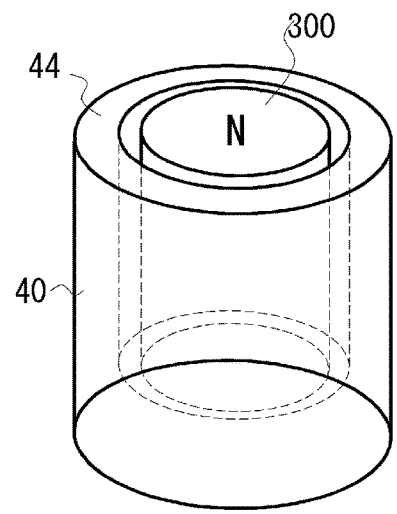

Furthermore, as shown in FIG. 10G, a magnetic material (for example, shaft such as a soft iron) 58 is arranged in the space between the center of the four magnets (center of the holder 40) to collect the lines of magnetic force at the central portion. Furthermore, as shown in FIG. 10H, the magnets may be arranged at a diamond shape. In this case, the internal space of the holder 40 may also have the diamond shape. Furthermore, as shown in FIG. 10I, it is also possible to arrange three magnets so that two N poles are exposed and one S pole is exposed, and as shown in FIG. 10J, it is also possible to arrange five magnets or to arrange six magnets as shown in FIG. 10K. Furthermore, as shown in FIG. 10L, a plurality of magnets, in which each magnet including a S pole and a N pole at the one surface, are arranged such that the S poles and the N poles are alternately disposed, and magnetic body 58 may also be arranged in the center.

Another embodiment of the present invention will be described furthermore. In the above embodiments, a plurality of magnets received in the holder 40 include at least one N pole and at least one S pole at the side of facing with the magnetic panel, however, in this embodiment, as shown in FIG. 11, one magnet 300 is accommodated in the holder 40. The surface of the N pole of the magnet 300 is recessed by the depth Δd from the edge 44 of the holder 40. Even in such configuration, since the lines of magnetic force from the N pole recessed by Δd are directed to the S pole through the holder 40, the lines of magnetic force are suppressed within the radius of the holder 40 and are easily extended at vertical direction, thus the magnetic field acts to the microcapsules of the magnetic panel effectively.

Furthermore, as discussed with respect to the second embodiment, the adjustment mechanism 200 for adjusting the height of the magnet 300 can be applied to the configuration shown in FIG. 11. Also in this case, it should be noted that the surface of the magnet 300 is adjusted within a range not exceeding the edge 44 of the holder 40. That is, Δd<=0.

In the above embodiments, the cylindrical grip portion, the end portion and the holder are exemplified, however their shapes are not limited to the cylindrical shape. They may be other rectangular shapes or elliptical shapes. In particular, the shape of the end portion is arbitrary, and the internal space formed therein is also arbitrary. Also, the size and shape of the magnets accommodated in the holder are arbitrary. Preferably, the shape and size of the magnet are selected according to the shape and size of the internal space of the holder, or the shape and size of the internal space of the holder are selected according to the shape and size of the magnet.

Although the preferred embodiments of the present invention have been described in detail above, the present invention is not limited to the specific embodiments, but various other modifications and/or changes may be made without departing from the scope of the present invention described in the claims.

What is claimed is:

1. A magnetic pen for use in drawing arbitrary characters, figures, and symbols on a magnetic panel for a display by applying a magnetic field, the magnetic pen comprising:
    a body that includes an end portion;
    a holder made of a magnetic material attached to the end portion, an internal space formed in the holder; and
    a magnet having an S pole and an N pole arranged in the internal space of the holder so that the S pole and the N pole are opposite the magnetic panel, wherein an end surface of the magnet is located so as to be recessed from an edge of the holder.

2. The magnetic pen according to claim 1, further comprising an adjusting mechanism configured to adjust a position of the magnet with respect to the edge of the holder.

3. The magnetic pen according to claim 2, wherein a plurality of cylindrical magnets are arranged in the internal space of the holder and a magnetic member is arranged in a space formed at the center of the plurality of cylindrical magnets.

4. The magnet pen according to claim 2, wherein the holder is rotatable about the end portion.

5. The magnetic pen according to claim 1, wherein a plurality of cylindrical magnets are arranged in the internal space of the holder and a magnetic member is arranged in a space formed at the center of the plurality of cylindrical magnets.

6. The magnetic pen according to claim 5, further comprising a grip portion connected to the end portion, wherein the end portion is connected to the grip portion through a universal joint and the end portion includes a sliding guide for sliding on a surface of the magnetic panel.

7. The magnet pen according to claim 6, wherein an axis of the holder is substantially perpendicular to a plane of the magnetic panel.

8. The magnetic pen according to claim 7, wherein the universal joint is attached so as to offset from the center of the holder.

9. The magnet pen according to claim 5, wherein the holder is rotatable about the end portion.

10. The magnetic pen according to claim 1, wherein the holder is rotatable about the end portion.

11. A magnetic pen for use in drawing arbitrary characters, figures, and symbols on a magnetic panel for a display by applying a magnetic field, the magnetic pen comprising:
a body that includes an end portion;
a holder made of a magnetic material attached to the end portion, an internal space formed in the holder;
a magnet having an S pole and an N pole arranged in the internal space of the holder so that the S pole and the N pole are opposite the magnetic panel, wherein an end surface of the magnet is located so as to be recessed from an edge of the holder; and
a grip portion connected to the end portion, wherein the end portion is connected to the grip portion through a universal joint and the end portion includes a sliding guide for sliding on a surface of the magnetic panel.

12. The magnet pen according to claim 11, wherein an axis of the holder is substantially perpendicular to a plane of the magnetic panel.

13. The magnetic pen according to claim 12, wherein the universal joint is attached so as to offset from the center of the holder.

14. The magnet pen according to claim 12, wherein the holder is rotatable about the end portion.

15. The magnetic pen according to claim 11, wherein the holder is rotatable about the end portion.

16. A magnetic pen for use in drawing arbitrary characters, figures, and symbols on a magnetic panel for a display by applying a magnetic field, the magnetic pen comprising:
a body that includes an end portion;
a holder made of a magnetic material attached to the end portion, an internal space formed in the holder;
a magnet having an S pole and an N pole arranged in the internal space of the holder so that the S pole and the N pole are opposite the magnetic panel, wherein an end surface of the magnet is located so as to be recessed from an edge of the holder;
an adjusting mechanism configured to adjust a position of the magnet with respect to the edge of the holder; and
a grip portion connected to the end portion, wherein the end portion is connected to the grip portion through a universal joint and the end portion includes a sliding guide for sliding on a surface of the magnetic panel.

17. The magnet pen according to claim 16, wherein an axis of the holder is substantially perpendicular to a plane of the magnetic panel.

18. The magnetic pen according to claim 17, wherein the universal joint is attached so as to offset from the center of the holder.

* * * * *